US010965589B2

(12) United States Patent
Narasimhan et al.

(10) Patent No.: US 10,965,589 B2
(45) Date of Patent: Mar. 30, 2021

(54) FAST RECEIVE RE-CONVERGENCE OF MULTI-POD MULTI-DESTINATION TRAFFIC IN RESPONSE TO LOCAL DISRUPTIONS

(71) Applicant: Cisco Technology, Inc., San Jose, CA (US)

(72) Inventors: Hrishikesh Narasimhan, Cupertino, CA (US); Sundher Narayanaswamy, San Jose, CA (US); Biju M. Mammen, Santa Clara, CA (US); Balaji Muthuvarathan, Fremont, CA (US); Arnav Goel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/289,540

(22) Filed: Feb. 28, 2019

(65) Prior Publication Data

US 2020/0280513 A1 Sep. 3, 2020

(51) Int. Cl.
*H04L 12/28* (2006.01)
*H04L 12/753* (2013.01)
*H04L 12/761* (2013.01)
*H04L 12/24* (2006.01)
*H04L 12/743* (2013.01)
*H04L 12/751* (2013.01)

(52) U.S. Cl.
CPC ............. *H04L 45/48* (2013.01); *H04L 41/12* (2013.01); *H04L 45/02* (2013.01); *H04L 45/16* (2013.01); *H04L 45/7453* (2013.01)

(58) Field of Classification Search
CPC ......... H04L 45/48; H04L 45/52; H04L 45/74; H04L 45/741; H04L 45/7453; H04L 49/10

USPC ................ 370/408, 419, 420, 437
See application file for complete search history.

(56) References Cited

U.S. PATENT DOCUMENTS 7,519,010 B1 * 4/2009 Aggarwal ............... H04L 12/18
370/254
7,756,017 B2 7/2010 Goyal et al.
7,760,668 B1 * 7/2010 Zinjuvadia ............. H04L 45/02
370/256

(Continued)

OTHER PUBLICATIONS

Cisco, "Forwarding Within the ACI Fabric," ACI Fabric Optimizes Modern Data Center Traffic Flows, Jun. 7, 2018, 26 pages.

*Primary Examiner* — Dmitry Levitan
(74) *Attorney, Agent, or Firm* — Patterson + Sheridan, LLP

(57) ABSTRACT

One technique includes receiving, in a first network, a multi-destination packet from a second network, and determining, based on the multi-destination packet, a first multi-destination tree in the first network for forwarding the multi-destination packet. In response to determining that the first multi-destination tree is not rooted on the network device, a second multi-destination tree in the first network is determined, and the multi-destination packet is transmitted using the second multi-destination tree. Another technique includes, upon detecting a first network device joining a network, sending a first indication to a second network device that the first network device is in a state for an amount of time. After the amount of time has elapsed, a second indication that the first network device has exited the state is sent to the second network device. A topology of the network is updated after the first network device has exited the state.

15 Claims, 10 Drawing Sheets

(56) References Cited

U.S. PATENT DOCUMENTS

| | | | |
|---|---|---|---|
| 8,699,486 B1* | 4/2014 | Luo | H04L 12/18 |
| | | | 370/390 |
| 8,923,112 B2* | 12/2014 | Farkas | H04L 45/00 |
| | | | 370/217 |
| 9,077,562 B2 | 7/2015 | Rajagopalan et al. | |
| 9,203,744 B2* | 12/2015 | Ginsberg | H04L 45/48 |
| 9,306,856 B2* | 4/2016 | Parameswaran | H04L 12/185 |
| 9,369,376 B2* | 6/2016 | Yuan | H04L 45/16 |
| 9,565,028 B2* | 2/2017 | Addanki | H04L 49/201 |
| 9,628,293 B2* | 4/2017 | Yu | H04L 45/16 |
| 9,667,431 B2 | 5/2017 | Pani | |
| 10,523,468 B2* | 12/2019 | Zou | H04L 12/6418 |
| 2020/0186413 A1* | 6/2020 | Subagio | H04L 43/16 |

* cited by examiner

FAST RECEIVE RE-CONVERGENCE OF MULTI-POD MULTI-DESTINATION TRAFFIC IN RESPONSE TO LOCAL DISRUPTIONS

TECHNICAL FIELD

Embodiments presented in this disclosure generally relate to communication networks and, more specifically, to improved techniques for forwarding, in a first network (or pod), multi-destination traffic received from a second network (or pod), in response to service disruptions in the first network.

BACKGROUND

Data center fabrics can be deployed with a local-site controller managing a set of switches using various types of architectures. One example data center design called a multi-pod was developed to overcome several limitations of older network architectures. In this fabric architecture, multiple pods (or networks) are interconnected via a Layer 3 (L3) internet protocol (IP) network, and the multiple pods are managed as a single network fabric. Each pod implements a separate spine-and-leaf topology, in which every lower-tier switch (leaf layer) is connected to each of the top-tier switches (spine layer) in a full-mesh topology. The leaf layer in each pod consists of access switches that connect to devices such as servers. The spine layer in each pod is the backbone of the pod and is responsible for interconnecting all leaf switches in the pod.

Multi-pod architectures generally support unicast and multi-destination traffic between a source and one or more destinations. Unicast traffic refers to network traffic that is routed from one source to one destination. Multi-destination traffic refers to traffic that is routed to two or more destinations. Multi-destination traffic generally constitutes a substantial amount of the traffic in today's data center fabrics. For example, multi-destination traffic can include broadcast traffic (e.g., traffic sent to all devices in a network), multicast traffic (e.g., traffic sent to multiple, selected addresses on a network), and unknown unicast traffic (e.g., unicast traffic sent with unknown destination addresses).

In some cases, one or more pods in a multi-pod fabric can experience service interruptions due to, for example, link failures, switch additions, switch removals, maintenance, etc. These service interruptions, in turn, can cause temporary disruptions to multi-destination traffic that is received from other pods in the fabric. Given that multi-destination traffic constitutes a substantial amount of traffic in today's fabrics, such disruptions can significantly impact performance of switches in the fabric.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
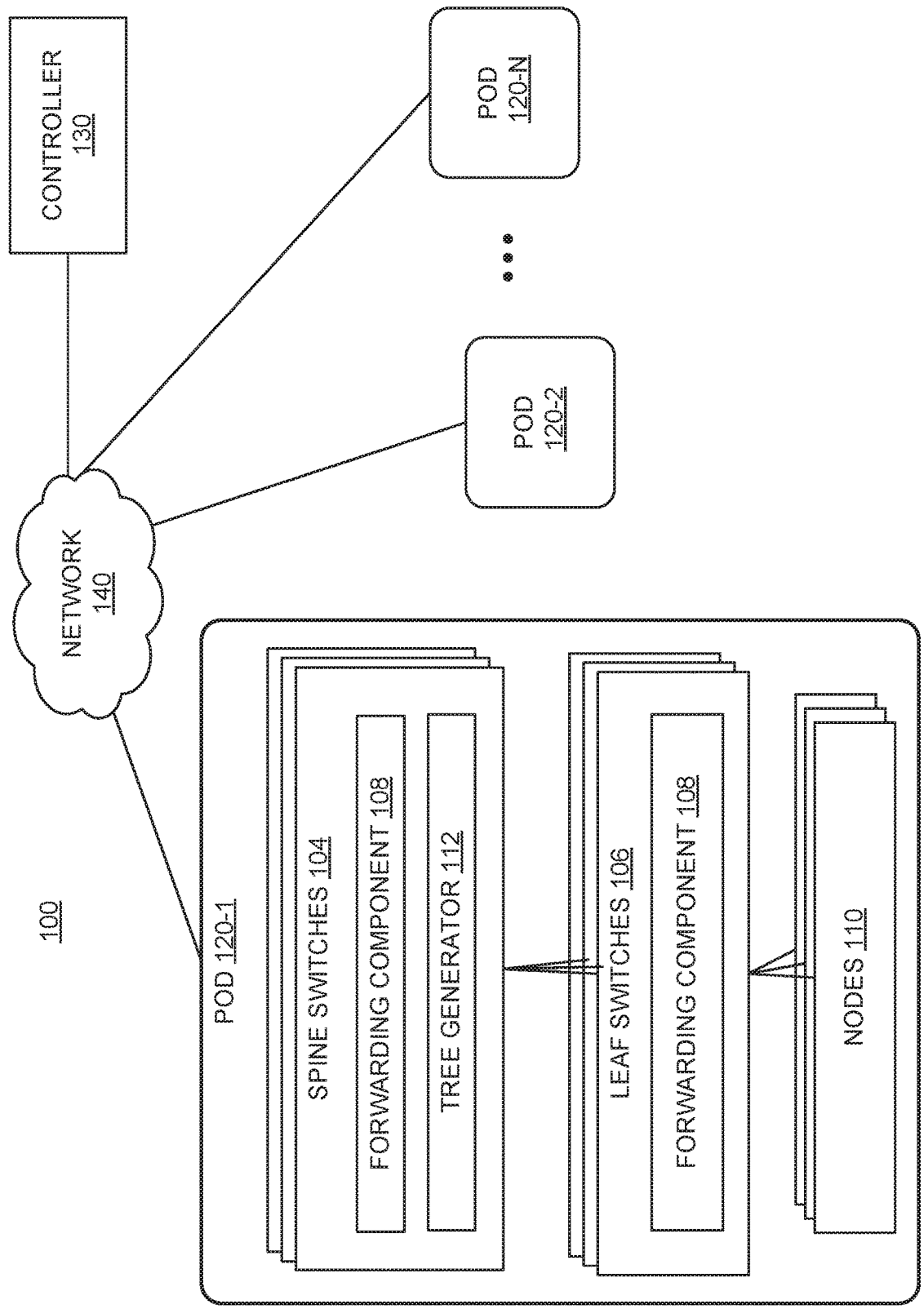
FIG. 1 illustrates an example network architecture for a multi-pod fabric, according to one embodiment described herein.

One embodiment presented in this disclosure provides a method performed by a first network device. The method generally includes receiving a multi-destination packet from a second network and determining, based on the multi-destination packet, a first multi-destination tree of a plurality of multi-destination trees in the first network associated with forwarding of the multi-destination packet. The method also includes determining that the first multi-destination tree is rooted on a second network device, different from the first network device. The method further includes, in response to determining that the first multi-destination tree is rooted on the second network device, determining a second multi-destination tree of the plurality of multi-destination trees in the first network. The method further yet includes transmitting the multi-destination packet using the second multi-destination tree.

Another embodiment presented in this disclosure provides a network device. The network device generally includes a processor and a memory containing a program that, when executed by the processor, performs an operation. The operation includes receiving, in a first network, a multi-destination packet from a second network and determining, based on the multi-destination packet, a first multi-destination tree of a plurality of multi-destination trees in the first network associated with forwarding of the multi-destination packet. The operation also includes determining that the first multi-destination tree is rooted on another network device, different from the network device. The operation further includes, in response to determining that the first multi-destination tree is rooted on the other network device, determining a second multi-destination tree of the plurality of multi-destination trees in the first network. The operation further yet includes transmitting the multi-destination packet using the second multi-destination tree.

Another embodiment presented in this disclosure provides a method for minimizing data interruptions in a network. The method includes, upon detecting a first network device joining the network, sending a first indication to at least a second network device that the first network device is in a state for a predetermined amount of time. The method also includes, after the predetermined amount of time has elapsed, sending a second indication to at least the second network device that the first network device has exited the state. The method further includes updating a topology of the network comprising the first network device and at least the second network device, after the first network device has exited the state.

Example Embodiments

Embodiments herein describe improved techniques for forwarding, within a first pod, multi-destination traffic received from a second pod, in response to service interruptions encountered in the first pod.

In one embodiment, a spine switch in a first network (e.g., first pod) receives a multi-destination packet from a second network (e.g., second pod). The spine switch determines, based on the multi-destination traffic, a first multi-destination tree to be used for forwarding the multi-destination traffic within the first network. In response to determining that the first multi-destination tree is not rooted at the spine switch, the spine switch determines a second multi-destination tree that is rooted at the spine switch to use for forwarding the multi-destination traffic within the first network. The spine switch forwards the multi-destination traffic to another switch (e.g., leaf switch) in the first network using the second multi-destination tree. Doing so can substantially reduce the convergence time within a pod, since the spine switch can use other available multi-destination trees rooted at the spine switch to forward multi-destination traffic.

Another embodiment includes techniques for enhancing a routing protocol (e.g., intermediate system-to-intermediate system (IS-IS)) employed by network devices in a network. One example technique includes delaying a shortest path first (SPF) calculation related to a new network device joining a network, e.g., until an adjacency has been setup completely. Another example technique includes advertising a preference of a network device as the root for a default (or system) multi-destination tree tag. Yet another example technique includes disable an internal sync exchange for multi-destination traffic movement of links between the same peer network device. By using one or more (or a combination) of these techniques, embodiments can substantially reduce multi-destination traffic loss when encountering local disruptions.

Note that while many of the following embodiments are discussed with reference to a spine-leaf architecture, the techniques discussed herein are not limited to the spine-leaf architecture. The techniques may be extended to any network architecture in which access network devices communicate with each other via multiple core network devices providing redundancy in terms of the path a data flow may take between two access network devices.

FIG. 1 illustrates an example network fabric 100 including multiple pods 120 1-N interconnected via a network 140, according to one embodiment. Each pod 120 implements a spine-leaf topology that includes multiple spine switches 104 (also referred to as core network switches, "end of row" (EoR) switches, etc.) and multiple leaf switches 106 (also referred to as access network switches, "top of rack" (ToR) switches, etc.). Each leaf switch 106 is connected to each spine switch 104. The spine switches 104 together are often referred to as the spine of the leaf-spine topology within the pod 120.

Each pod 120 within the network fabric 100 also includes nodes 110 coupled to one or more of the leaf switches 106. Each of the nodes 110 may include a server, a virtual machine, a software application, etc. In some embodiments, a node 110 in a pod 120 (e.g., pod 120-1) can communicate with another node 110 in the same pod 120 (e.g., pod 120-1). In some embodiments, a node 110 in a pod (e.g., pod 120-1) can communicate with another node 110 in a different pod (e.g., pod 120-2) via the network 140. In some embodiments, one or more of the pods 120 can be deployed in different data center geographical locations (e.g., pod 120-1 is in a first data center and pod 120-2 is in a second data center). In some embodiments, one or more of the pods 120 can be deployed in the same data center geographical location (e.g., pod 120-1 and pod 120-2 are in the same data center location).

The network 140 (also referred to as an inter-pod network) generally represents a network that forwards Layer 3 (L3) IP traffic between the pods 120 1-N. Each pod 120 1-N connects to the network 140 via its respective spine switches 104. In some embodiments, the network 140 can be a single L3 device. In some embodiments, the network 140 can include multiple network devices (e.g., in a multi-protocol label switch (MPLS) network). The network 140 may forward data plane traffic and/or control plane traffic between the pods 120 1-N. Generally, the controller 130 is a central entity that manages and configures policies of (the spine switches 104 and leaf switches 106 in) each pod 120 1-N. In addition to forwarding data plane traffic, the network 140 may forward management or control plane traffic between the controller 130 and each of the pods 120 1-N.

In some embodiments, the network fabric 100 may be implemented as a Cisco Application Centric Infrastructure (ACI) multi-pod or Software Defined Network (SDN). For example, each pod 120 can represent a different ACI network managed by the controller 130. From a management perspective, the (central) controller 130 (e.g., SDN controller), also referred to as the Application Policy Infrastructure Controller (APIC) manages and configures the policy on each of the switches in the network fabric 100. The APIC acts as a central repository for all policies and has the ability to rapidly deploy and re-deploy hardware, as needed, based on network performance.

The Cisco ACI multi-pod may also serve as a platform for other services that are performed within the data center or cloud environment. For example, through the use of the (central) controller 130, third party services may be integrated for advanced security, load balancing, and monitoring. Note that ACI is merely used as an example. The embodiments presented herein are not limited to such and can be used with any other suitable SDN platform.

Each pod 120 1-N may run different instances of one or more protocols, such as IS-IS, council of oracles protocol (COOP), border gateway protocol (BGP), multiprotocol BGP (MP-BGP), etc. Within each pod 120 1-N, the leaf switches 106 and spine switches 104 can use IS-IS as an infrastructure routing protocol (also referred to as a link state routing protocol) to peer with each other, exchange IP information, etc. (e.g., to determine where each respective switch is located within the leaf-switch topology with respect to other switches). COOP is generally used to communicate mapping information (e.g., location, identity, etc.) of nodes (e.g., endpoints) to spine switches 104 in a pod 120. MP-BGP is generally used to carry routing information (e.g., between pods 120 1-N) across the network 140.

As noted, the network fabric 100 may support multi-destination traffic between a source (e.g., in pod 120-2) and multiple destinations (e.g., in pod 120-1). As an example, the multi-destination traffic can include tenant multicast traffic, broadcast traffic (e.g., Address Resolution Protocol (ARP)/ gratuitous ARP (GARP) traffic), and unknown unicast traffic (e.g., for endpoint learning, forwarding to silent hosts, etc.). Network devices (e.g., spine switches 104, leaf switches 106, etc.) generally use multi-destination trees to determine multi-destination traffic forwarding destinations. For example, each multi-destination tree determines the path (e.g., through the pod) that the packet will traverse as it gets delivered. In one embodiment, the multi-destination trees can be used to load balance multi-destination traffic within the pod(s) 120. Each spine switch 104 and leaf switch 106 includes a forwarding component 108 that enables forwarding of multi-destination traffic using multi-destination trees.

Figure 2:
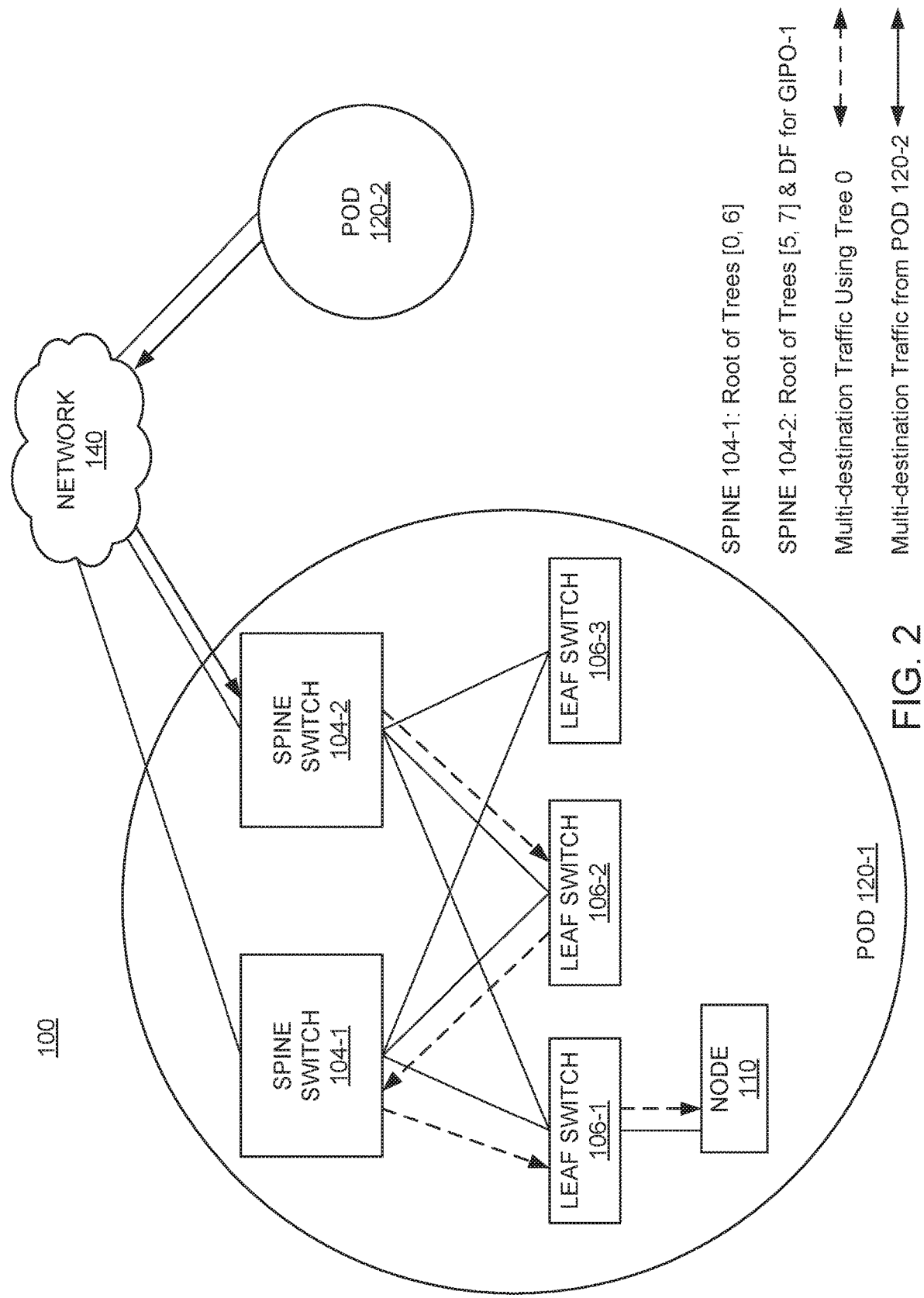
FIG. 2 further illustrates components of the network architecture illustrated in FIG. 1, according to one embodiment described herein.

Each multi-destination tree is associated with a unique multi-destination tree tag. The ingress network device (e.g., ingress leaf switch 106 or ingress spine switch 104) assigns a multi-destination tree tag to the multi-destination traffic when forwarding the traffic. By way of example, FIG. 2 shows an example network (multi-pod) fabric 100 that includes a (first) pod 120-1 and a (second) pod 120-2 interconnected via the network 140 (e.g., IPN), according to one embodiment. In this example, assume spine switch 104-2 is the ingress network device that receives multi-destination traffic (e.g., from pod 120-2) via the network 140. That is, the spine switch 104-2 may receive a packet from a node 110 in pod 120-2 to be transmitted via the leaf-spine topology in pod 120-1 to multiple destination nodes (e.g., node(s) 110). The spine switch 104-2 can assign a multi-destination tree tag to the packet when forwarding it to the leaf layer (e.g., one of leaf switches 106 1-3). Any intermediate leaf switches 106 that receive the packet in turn forward the packet along the multi-destination tree associated with the multi-destination tree tag.

In one embodiment, the multi-destination tree tag can be assigned to the packet as part of the destination multicast address. In one embodiment, the ingress network device can assign a multi-destination tree tag to a packet by computing a hash over the packet's frame fields modulo'd over the available multi-destination trees at the ingress network device. The multi-destination tree tag can be retained for the frame data while it is in the pod. In one embodiment, the multi-destination tree tag is carried in the lowest nibble of the destination IP or the group IP outer address (GIPO).

Each multi-destination tree may be rooted on one of the spine switches 104. FIG. 2 shows a particular example with four multi-destination trees 0, 5, 6, 7. In the depicted example, spine switch 104-1 is the root node for multi-destination trees 0 and 6, and spine switch 104-2 is the root node for multi-destination trees 5 and 7. Each leaf switch 106-1 to 106-3 can connect to each multi-destination tree 0, 5, 6, 7 either directly (e.g., as shown in FIG. 2) or through intermediate network devices. Note that the number of multi-destination trees, spine switches, leaf switches, nodes, etc., in the pod 120-1 are shown are shown as a reference example, and that the pod 120-1 can include any number of multi-destination trees, spine switches, leaf switches, nodes, etc.

The controller 130 is generally responsible for placing the roots of the multi-destination trees on the spine switches 104, e.g., as part of the spine-leaf discovery process. As part of the placement, the controller 130 can specify the number of multi-destination trees to be used within a pod 120, the roots of the multi-destination trees, multi-destination tree tags, etc. The controller 130 is generally responsible for re-configuring multi-destination trees in the event of topology changes (e.g., link failures, switch additions, switch removals, etc.).

In current multi-pod fabrics, multi-destination traffic that is received at an ingress network device from a different pod 120 is typically assigned a default multi-destination tree (e.g., multi-destination tree 0), e.g., due to the hash calculated over the inner fields of the received packet(s). For example, packet(s) with a GIPO arriving at an ingress network device (from a different pod 120) may have one or more bits of the GIPO zeroed out. This, in turn, may result in the ingress network device assigning the default multi-destination tree for the packet(s), e.g., when a hash is generated using the zeroed bits of the GIPO.

In some cases, however, forcing multi-destination traffic received from another pod to take the default multi-destination tree can impact load balancing within the spine-leaf topology of the pod 120. For example, if the ingress spine switch is not the root of the default multi-destination tree, this could lead to sub-optimal forwarding (and, in turn, increased latency) as the ingress spine switch would have to use intermediate transit nodes in order to forward the multi-destination traffic along the default multi-destination tree. By way of example, FIG. 2 depicts a scenario in which multi-destination traffic. In this topology, spine switch 104-1 is the root for the default multi-destination tree (e.g., multi-destination tree 0) and leaf switch 106-2 acts as the transit node (e.g., TOR), completing the default multi-destination tree at spine switch 104-2. In general, the multi-destination traffic that is received from the network 140 into pod 120-1 can land on either spine switch 104-1 or spine switch 104-2. For example, the ingress spine switch (e.g., spine switch 104-1, spine switch 104-2) that receives multi-destination traffic from the network 140 is generally governed by IS-IS GIPO striping behavior between the spine switches. Here, GIPO-1 is striped to spine switch 104-2 (e.g., spine switch 104-2 is the designated forwarder (DF) for GIPO-1), and thus the network 140 forwards multi-destination traffic from pod 120-2 to the spine switch 104-2 in pod 120-1. However, because multi-destination traffic received by spine switch 104-2 is setup to use the default multi-destination tree for forwarding and spine switch 104-2 is not the root of the default multi-destination tree, the multi-destination traffic has to be forwarded to leaf switch 106-1 in multiple hops (e.g., as opposed to a single hop), resulting in sub-optimal forwarding. In particular, as shown, the multi-destination traffic is forwarded from spine switch 104-2 to leaf switch 106-2 (e.g., in a first hop), then from leaf switch 106-2 to spine switch 104-1 (e.g., in a second hop), and lastly from spine switch 104-1 to leaf switch 106-1 (e.g., in a third hop).

In addition to sub-optimal forwarding caused by forcing the ingress spine switch 104-2 to use the default multi-destination tree (despite the availability of other rooted multi-destination trees at the ingress spine switch 104-2), local events (or triggers) within the pod (e.g., affecting switches, links, network, etc.) can cause disruptions that affect services across the pod, such as spanning tree protocol (STP), hot standby router protocol (HSRP), virtual router redundancy protocol (VRRP), etc., that impact convergence within the pod. As an example, local triggers, such as a spine switch/leaf switch upgrade/crash, can result in a transition of the default multi-destination tree, which in turn causes a disruption of the multi-destination traffic traversing the default multi-destination tree. These traffic disruptions can significantly increase latency of the multi-destination traffic within the pod.

As such, embodiments provide techniques that allow an ingress spine switch (e.g., in a receiving pod) to substantially reduce convergence (e.g., in the event of local disruptions caused by events, such as link failures, switch failures, network failures, etc.) when forwarding multi-destination traffic received from another pod. The techniques presented herein can also be used to improve load balancing when forwarding multi-destination traffic received from another pod.

In one embodiment, each spine switch 104 is configured with a tree generator 112 that allows the spine switch 104 to change (or assign or switch) a multi-destination tree tag assigned to a multi-destination packet to another available multi-destination tree tag associated with a multi-destination tree rooted at the spine switch 104 (also referred to as "regenerating" a multi-destination tree tag). In particular, the spine switch 104 that is the ingress network device can use the tree generator 112 to switch the default multi-destination tree tag (e.g., multi-destination tree tag 0) assigned to a multi-destination packet received from a different pod 120 to another multi-destination tree tag associated with a multi-destination tree rooted at the spine switch 104. Doing so can substantially improve load balancing when forwarding the multi-destination packet (e.g., by reducing the number of hops to the destination TOR) within the pod and/or reduce receive convergence time in the pod in the event of local disruptions.

Figure 3:
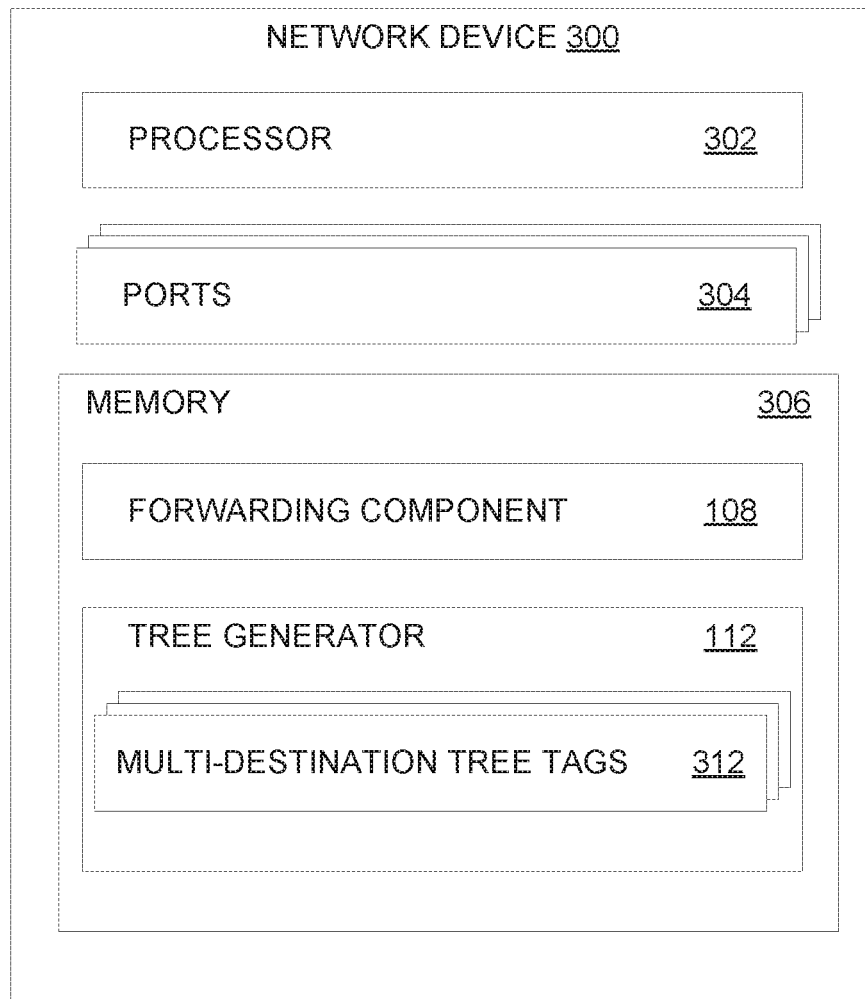
FIG. 3 illustrates an example network device configured with a tree generator, according to one embodiment described herein.

FIG. 3 illustrates an example network device 300 configured with a tree generator 112, according to one embodiment. In one embodiment, the network device 300 is representative of a spine switch (e.g., spine switch 104 illustrated in FIG. 1). The network device 300 includes a processor 302, communication ports 304, and memory 306. The processor 302 may be any processing element capable of performing the functions described herein. The processor 302 represents a single processor, multiple processors, a processor with multiple cores, and combinations thereof. The communication ports 304 facilitate communication between the network device 300 and other network devices (e.g., spine switch 104, leaf switch 106, etc.) and/or nodes 110. The memory 306 may be either volatile or non-volatile memory and include RAM, flash, cache, disk drives and the like. Although shown as a single entity, the memory 306 may be divided into different memory storage elements such as RAM and one or more hard disk drives.

As shown, the memory 306 includes a forwarding component 108 and tree generator 112. The tree generator 112 is generally configured to switch to another multi-destination tree, e.g., by assigning a different multi-destination tree tag associated with the different multi-destination tree to the packet. In one embodiment, the tree generator 112 can determine whether a multi-destination packet received from another pod is assigned a multi-destination tree tag associated with a multi-destination tree that is rooted at the network device 300. If the tree generator 112 determines that the multi-destination tree tag assigned to the multi-destination packet is not associated with a multi-destination tree rooted at the network device 300, the tree generator 112 switches to one of the available multi-destination trees rooted at the network device 300.

The tree generator 112 includes multi-destination tree tags 312, which are used to identify the multi-destination trees available within the pod 120 (e.g., pod 120-1) in which the network device 300 is located. In one embodiment, the multi-destination tree tags 312 may identify the multi-destination trees rooted at each spine switch 104 in the pod 120 in which the network device 300 is located. Using FIG. 4 as an example, the multi-destination tree tags 312 at spine switch 104-2 may identify multi-destination trees 5 and 7 (rooted at spine switch 104-2) and multi-destination trees 0 and 6 (rooted at spine switch 104-1). In one embodiment, the multi-destination tree tags 312 may identify a subset of the multi-destination trees available within the pod 120 in which the network device 300 is located. For example, with reference to FIG. 4, the multi-destination tree tags 312 at spine switch 104-2 may just identify multi-destination trees 5 and 7 rooted at spine switch 104-2. The forwarding component 108 is configured to transmit (or forward) multi-destination traffic using the multi-destination tree assigned to the multi-destination traffic (e.g., by the tree generator 112).

Figure 4:
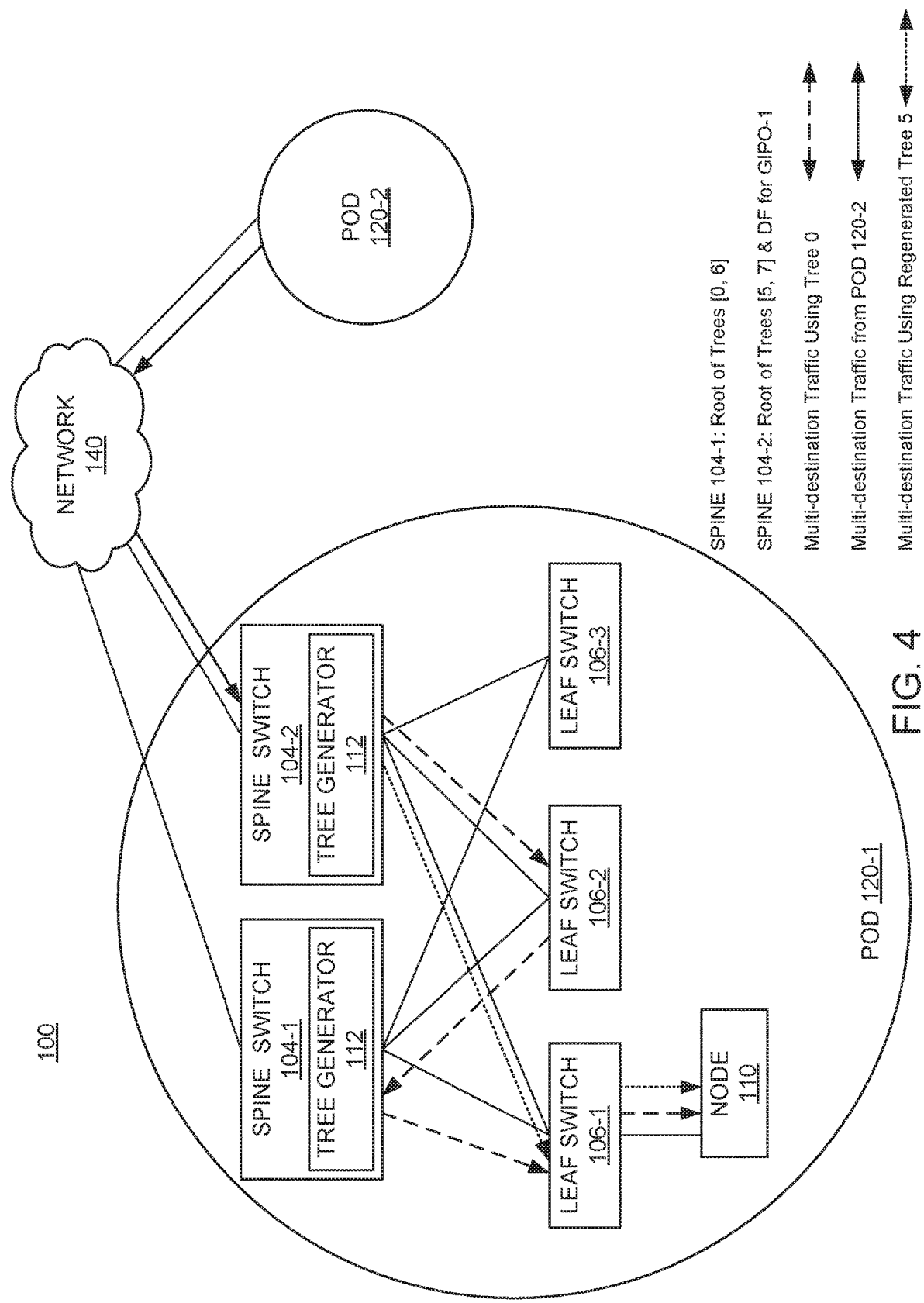
FIG. 4 illustrates an example scenario of a spine switch switching to a different multi-destination tree, according to one embodiment described herein.

FIG. 4 illustrates an example scenario of a spine switch (e.g., spine switch 104-2) switching to a different multi-destination tree to forward multi-destination traffic, according to one embodiment.

In the depicted scenario, similar to FIG. 2, spine switch 104-2 is the ingress network device in pod 120-1 that receives multi-destination traffic via the network 140 from pod 120-2. The multi-destination traffic that arrives at spine switch 104-2 is setup to use a default multi-destination tree (e.g., multi-destination tree 0), which is not rooted at the spine switch 104-2. In this situation, the spine switch 104-2 switches the multi-destination tree tag assigned to the multi-destination traffic to another multi-destination tree tag associated with a multi-destination tree (e.g., multi-destination tree 5) rooted at the spine switch 104-2. Doing so allows for optimal forwarding of multi-destination traffic within the pod 120-1. For example, as shown, switching to the multi-destination tree 5 rooted at spine switch 104-2 enables the spine switch 104-2 to directly deliver the multi-destination traffic to leaf switch 106-1 in a single hop, compared to three hops associated with multi-destination tree 0 in FIG. 2.

While FIG. 4 depicts the spine switch 104-2 switching the multi-destination tree to one of the multi-destination trees (e.g., multi-destination tree 5) rooted at the spine switch 104-2, in general, embodiments herein allow the spine switch 104-2 to choose any of the available multi-destination trees (e.g., multi-destination trees 0, 6, 5, 7) in a pod. By allowing the spine switch 104-2 to switch to a subset of the multi-destination trees rooted at the spine switch 104-2, the spine switch 104-2 can choose from different multi-destination trees that allow for forwarding multi-destination traffic to the destination TOR in a single hop. In order to limit the multi-destination trees that are not rooted at the spine switch 104-2 (referred to as transit multi-destination trees or transit multi-destination tree tags) from being selected (e.g., by the tree generator 112), the tree generator 112 may change the state of the transit multi-destination tree tags to "disabled."

Figure 5:
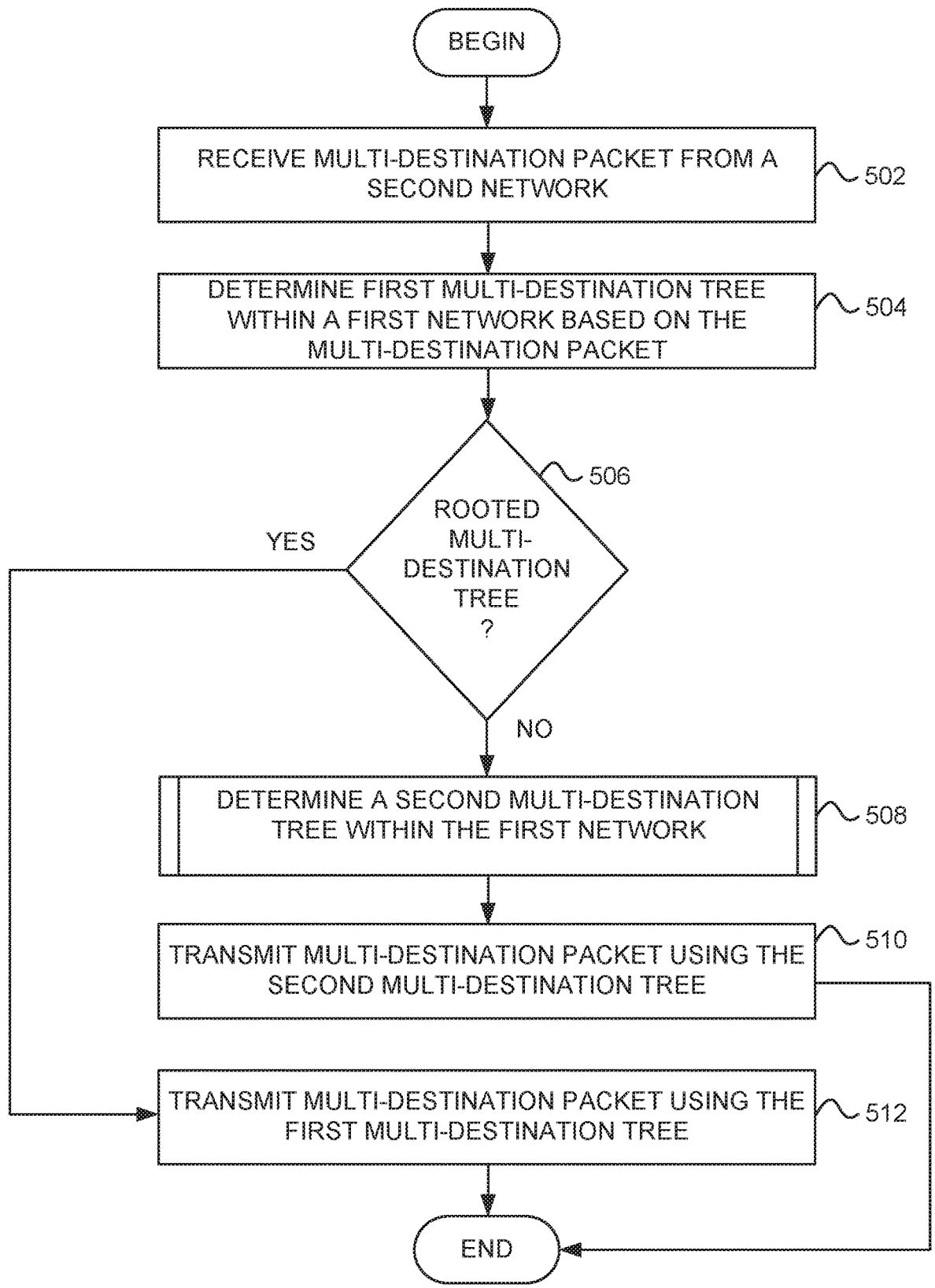
FIG. 5 is a flowchart for switching a multi-destination tree to use for forwarding multi-destination traffic, according to one embodiment described herein.

FIG. 5 is a flowchart of a method 500 for switching a multi-destination tree to use for forwarding multi-destination traffic, according to one embodiment. The method 500 may be performed by a network device (e.g., network device 300, spine switch 104, etc.) in a first network (e.g., pod 120-1).

Method 500 begins at block 502, where the network device receives a multi-destination packet from a second network (e.g., pod 120-2 via network 140). The multi-destination packet may include a broadcast packet, multicast packet, or unknown unicast packet. In one embodiment, the network device is the ingress network device (e.g., spine switch 104-2) of the first network. At block 504, the network device determines a first multi-destination tree to use for forwarding the multi-destination packet within the first network, based on the multi-destination packet. In one embodiment, for example, the network device may generate a hash of one or more fields of the multi-destination packet to determine a first multi-destination tree tag associated with the first multi-destination tree.

At block 506, the network device determines if the first multi-destination tree is a multi-destination tree rooted at the network device. For example, in cases where multi-destination traffic is received from a different pod, the network device may be configured to use a default multi-destination tree (e.g., multi-destination tree 0) for forwarding the multi-destination traffic. If the network device determines that the first multi-destination tree (e.g., default multi-destination tree, such as multi-destination tree 0) is rooted at the network device, the network device transmits the multi-destination packet using the first multi-destination tree (block 512), and the method ends. On the other hand, if the network device determines that the first multi-destination tree (e.g., default multi-destination tree) is not rooted at the network device, the network device determines a second multi-destination tree available within the first network (block 508), transmits the multi-destination packet using the second multi-destination tree (block 510), and the method ends.

Figure 6:
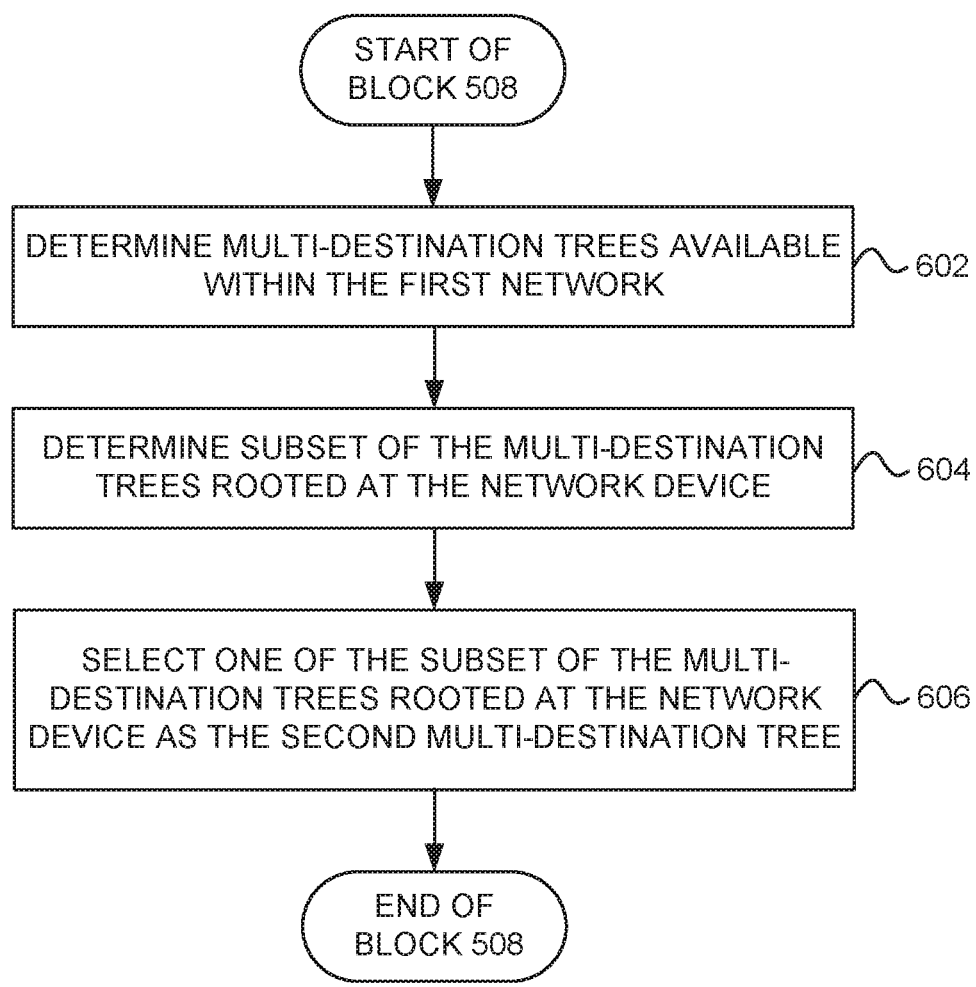
FIG. 6 is a flowchart for selecting a different multi-destination tree to use for forwarding multi-destination traffic, according to one embodiment described herein.

FIG. 6 is a flowchart of a method 600 for selecting a different (second) multi-destination tree to use for forwarding multi-destination traffic, according to one embodiment. The method 600 may be performed by a network device (e.g., network device 300, spine switch 104, etc.) in a first network (e.g., pod 120-1). Method 600 may be used to perform block 508 of method 500 in FIG. 5, according to one embodiment.

Method 600 begins at block 602, where the network device determines multi-destination trees available (e.g., multi-destination trees 0, 5, 6, 7) within the first network. In one embodiment, the network device may determine the available multi-destination trees based on a set of multi-destination tree tags (e.g., multi-destination tree tags 312) configured for the network device (e.g., by the controller 130). At block 604, the network device determines a subset (e.g., multi-destination trees 5 and 7) of the multi-destination trees rooted at the network device. At block 606, the network device selects one (e.g., multi-destination tree 5) of the subset of the multi-destination trees rooted at the network device as the second multi-destination tree.

By enabling an ingress spine switch to switch to a different multi-destination tree for forwarding multi-destination traffic received from a different pod, embodiments can substantially reduce the convergence time within the pod in the event of local disruptions caused by spine and/or leaf failures, upgrades, maintenance, etc. Additionally, since multiple rooted multi-destination trees are available for selection at the received pod, multi-destination traffic is load balance across the multi-destination trees, resulting in a better bandwidth utilization of the fabric links.

In some cases, the network fabric 100 may not support (e.g., allow) a network device (e.g., spine switch 104) to change a default multi-destination tree tag (associated with multi-destination traffic received from a different pod) to a different multi-destination tree tag for forwarding of multi-destination traffic. Thus, it may be desirable to provide techniques that can minimize service disruptions (due to, e.g., TOR and/or spine additions, removals, etc.) in the receiving pod that can impact the forwarding of multi-destination traffic.

As noted, one or more pods of a multi-pod fabric can have events, such as insertion of a new leaf (or TOR), that cause service disruptions within the pod(s). However, in cases where the network fabric 100 does not support multi-destination tree tag regeneration, the current routing protocol (e.g., IS-IS) used by the network devices in the pod(s) can cause significant multi-destination traffic loss in such events, leading to significant service disruptions. In one example, the service disruption can be due to black holing (e.g., dropping) of STP bridge protocol data units (BPDUs), e.g., leading to L2 loops and fabric meltdown. In some examples, the service disruption can be due to HSRP reachability issues and/or ARP delivery issues.

Consider the example network (multi-pod) fabric 100 in FIG. 2, in which multi-destination traffic flows from pod 120-2 to pod 120-1 and is setup to use the default multi-destination tree for forwarding within pod 120-1. Since the multi-destination traffic ingresses to the spine switch 104-2, which is not the root for the default multi-destination tree (e.g., multi-destination tree 0), the multi-destination traffic has to forwarded through a transit TOR (e.g., leaf switch 106-2) to reach the spine switch (e.g., spine switch 104-1) where the default multi-destination tree is rooted, e.g., in order to reach all the other TORs (e.g., leaf switches 106-1 and 106-3) in the pod 120-1. In these scenarios, there may service disruptions in the pod when a new TOR joins (and/or is removed from) the topology within the pod.

For example, with reference to FIG. 2, assuming leaf switch 106-2 goes down (e.g., is removed from the fabric), this can cause the transit TOR (e.g., for the default multi-destination tree) to shift to leaf switch 106-1 or leaf switch 106-3. The particular leaf switch that is chosen as the next transit TOR may be based on metric(s), such as cost, priority, highest node identifier, etc. Subsequently, when leaf switch 106-2 comes up (e.g., joins the fabric), this can cause the transit TOR to shift back to leaf switch 106-2 (e.g., assuming leaf switch 106-2 has the higher priority). In the current routing protocol (e.g., IS-IS) used in network fabrics, these transitions can cause significant traffic disruptions, as the network devices using the routing protocol can take a significant amount of time to discover multiple new links that come up and peer with other network devices. For example, the transitions can lead to staggered three-way adjacency completion between nodes and the new TOR, causing multiple IS-IS shortest path first (SPF) triggers. Each of these SPF triggers can result in a change of the default multi-destination tree, causing changes in the multi-destination transit path. Cumulative multi-destination traffic loss due to multiple changes in the multi-destination transit path can cause significant service disruption.

As such, embodiments provide techniques that allow network devices to minimize service disruptions during events, such as spine and/or TOR additions/removals, etc. More specifically, embodiments provide one or more enhancements to the routing protocol (e.g., IS-IS) that can be used by network devices to (re)-discover links in the leaf-spine topology in response to network events.

Figure 7:
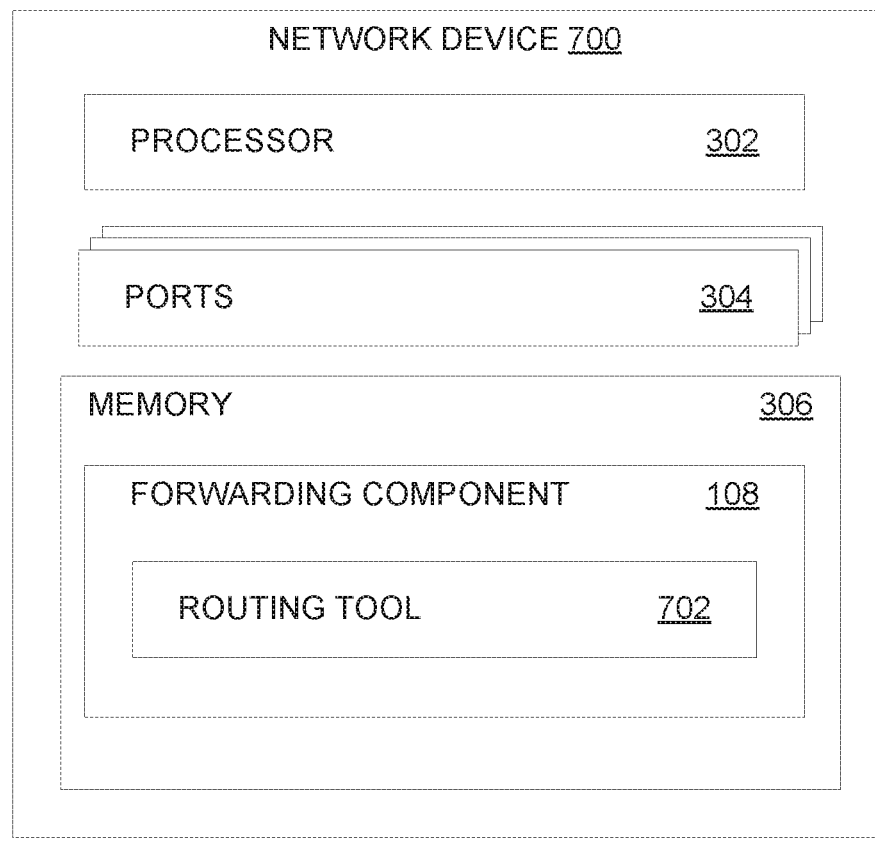
FIG. 7 illustrates an example network device configured with a routing tool, according to one embodiment described herein.

In one embodiment, each network device (e.g., spine switch 104 and leaf switch 106) deployed in a pod 120 (e.g., pod 120-1) is configured with a routing tool 702 that allows the network device to significantly reduce service disruptions when employing the routing protocol in response to network topology events. FIG. 7 illustrates an example network device 700 configured with a routing tool 702, according to one embodiment. In one embodiment, the network device 700 is representative of a leaf switch (e.g., leaf switch 106 illustrated in FIG. 1). In one embodiment, the network device 700 is representative of a spine switch (e.g., spine switch 104 illustrated in FIG. 1). Compared to the network device 300, the network device 700 includes a routing tool 702 (e.g., within the forwarding component 108). Note, however, that the routing tool 702 can be employed separately (or standalone) without the forwarding component 108. The routing tool 702 is configured to employ a routing protocol, such as IS-IS, to advertise and discover node(s) in response to network topology changes.

In one embodiment, the routing tool 702 is configured to enter a multi-destination overload mode for the network device 700 when the network device 700 joins a network fabric (e.g., spine-leaf topology within pod 120-1). Referring again to FIG. 2, when leaf switch 106-2 joins the fabric, the routing tool 702 advertises the leaf switch 106-2 as in an overload mode for multi-destination forwarding for a predetermined amount of time. In one embodiment, the amount of time may be a predetermined amount of time for the node to receive policy downloads, identify routing table, etc. After the predetermined amount of time, the routing tool 702 transitions the network device 700 out of overload mode. This initiates a single event across the fabric, where all of the nodes (using IS-IS, for example) can update the forwarding routes with respect to other nodes using a single (or minimum number of) SPF calculation. In other words, by having the newly joined network device enter the overload mode, the routing protocol running in the pod 120-1 can avoid multiple SPF calculations each time a new link with respect to the (newly) joined network device is discovered. In some embodiments, while in overload mode, the routing tool 702 can perform a bi-directional check, e.g., to determine the presence of back-links, and discard these links from consideration in the SPF calculation(s).

In one embodiment, the routing tool 702 is configured to perform a SPF calculation based in part on a default multi-destination tree tag and a priority (or preference) for the root of the default multi-destination tree. In current network fabrics, while the default multi-destination tree tag, in general, is advertised by all the spine switches, one (a first) of the spine switches is selected and considered as the root for the default multi-destination tree. When this (first) spine goes down, the next (second) spine is selected as the root and performs a SPF calculation. Similarly, when the (first) spine comes back up, it takes the role as the root node, and performs yet another SPF calculation. These multiple transitions, in which the root for the default multi-destination tree is changed multiple times, can cause significant traffic disruptions, as the multi-destination transit path can change with each root change.

As such, to avoid multiple changes in the root for the default multi-destination tree, the routing tool 702 of each spine switch 104 can be configured to advertise the default multi-destination tree tag along with a preference (or priority) of the spine switch 104 as the root for the default multi-destination tree tag. With reference to FIG. 2, the spine switch 104-1 is the root for the default multi-destination tree (e.g., multi-destination tree 0) and advertises the default multi-destination tree with preference "1" (indicating that spine switch 104-1 has the highest priority for the root). Subsequently, if spine switch 104-1 goes down, spine switch 104-2 will take over as the root for the default multi-destination tree, increment the preference to "2" (indicating that spine switch 104-2 now has the highest priority for the root) and advertise the default multi-destination with preference "2". Subsequently, if spine switch 104-1 comes back up, the spine switch 104-1 will take the preference advertised by spine switch 104-2 into account when it performs a SPF calculation. Continuing with this example, the spine switch 104-1 would not regain the root role for the multi-destination tree, since its preference "1" is lower than the preference "2" of spine switch 104-2. In this manner, embodiments can minimize service interruptions, by reducing root node changes between spine switches. In some embodiments, a bi-directional check may be performed during the SPF calculation to avoid loops. The bi-directional check may be performed prior to a sync-acknowledgement (ACK) exchange between the spine switch joining the network and another switch (e.g., leaf switch) in the fabric.

In one embodiment, the routing tool 702 of a network device (e.g., spine switch 104-2) is configured to refrain from a performing a sync exchange when a multi-destination tree tag is moved between links of a same peer (e.g., leaf switch 106-2) to the network device. In current network fabrics, whenever a node adds a link to a multi-destination tree tag, the node sends a sync message to its peer node and waits for an ACK from the peer node. This exchange is generally performed to avoid duplication of traffic. However, in these exchanges, the ACK for the sync message is generally sent after the SPF is completed by the peer node, creating a huge delay in traffic. For example, this sync-ACK process occurs, regardless of whether the multi-destination tree is moved between links of the same peer.

As such, to minimize delays associated with the sync-ACK process that occurs when a multi-destination tag is moved to a different link, the routing tool 702 can be configured to refrain from performing the sync-ACK process for multi-destination tag movement between links of the same peer. By avoiding this process in these situations, the multi-destination tag can be updated more quickly (e.g., compared to situations in which the sync-ACK process is performed), reducing traffic loss. Further, in some embodiments, as noted above, a bi-directional check can be added to the SPF calculation, e.g., prior to the sync-ACK process, to avoid loops.

Figure 8:
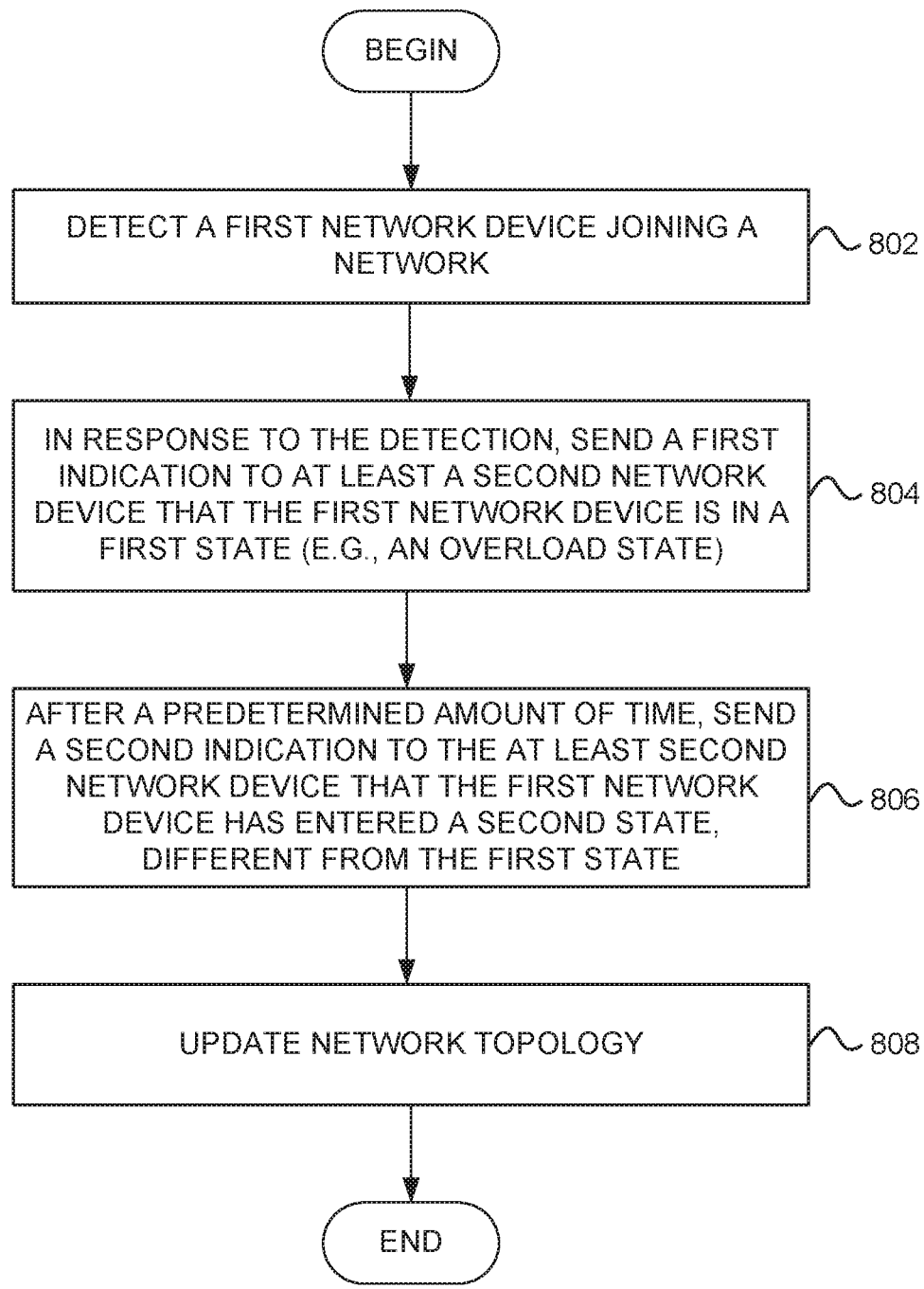
FIG. 8 is a flowchart for minimizing multi-destination traffic disruptions, according to one embodiment described herein.

FIG. 8 is a flowchart of a method 800 for minimizing multi-destination traffic disruptions, according to one embodiment. The method 800 may be performed by a routing tool (e.g., routing tool 702) implemented in at least one network device (e.g., network device 700, leaf switch 106, spine switch 104, etc.) and/or controller 130. The routing tool can implement a routing protocol, such as IS-IS.

Method 800 begins at block 802, where the routing tool detects a first network device (e.g., leaf switch 106-2) joining the network (e.g., pod 120-1). At block 804, the routing tool sends a first indication to at least a second network device (e.g., spine switch 104-2) that the first network device is in a first state (e.g., overload mode), in response to the detection. For example, as noted, when a network device joins a network, the routing tool can advertise the network device in overload mode for a predetermined amount of time, e.g., to give the network device time to initialize, receive configuration policies from the controller 130, determine adjacencies to neighbor nodes, etc. In some embodiments, while the first network device is in the overload mode, the routing tool can perform a bi-directional check to discard one or more links from consideration in the SPF calculation.

At block 806, the routing tool sends a second indication to the at least second network device that the first network device has entered a second state, different from the first state, after the predetermined amount of time has elapsed.

For example, the routing tool can indicate that the first network device has exited the overload mode and is ready to update routing tables via a SPF calculation. At block 808, the routing tool updates the network topology for each of the network devices in the network with a single event. For example, as noted, the routing tool can substantially reduce the number of SPF calculations that are performed in response to detecting that the first network device joined the fabric. Accordingly, by delaying the SPF calculation related to the first network device (e.g., until after the adjacency is setup completely), embodiments can substantially reduce multi-destination traffic loss for network fabrics that may not be capable of multi-destination traffic tag regeneration.

Figure 9:
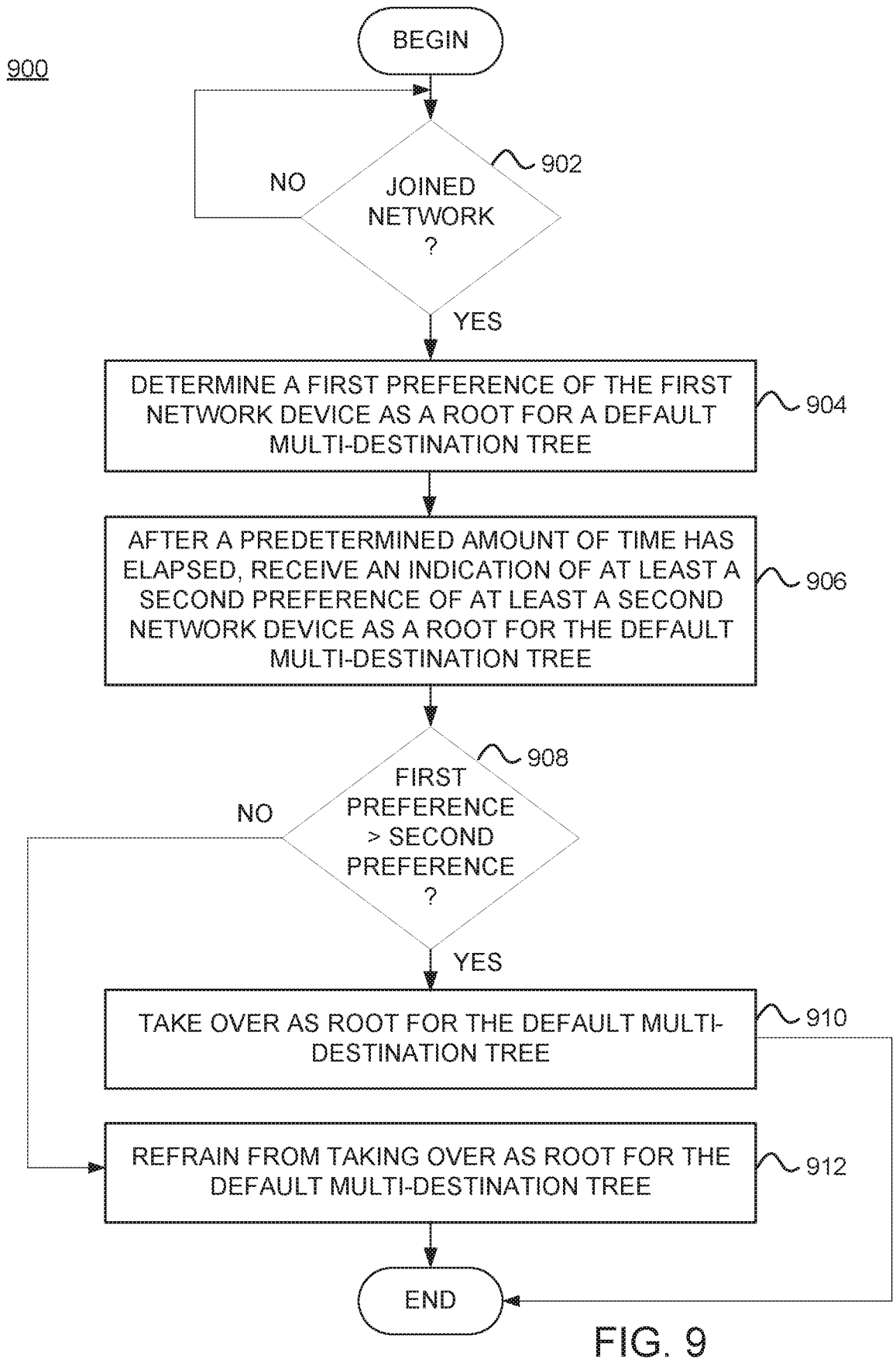
FIG. 9 is another flowchart for minimizing multi-destination traffic disruptions, according to one embodiment described herein.

FIG. 9 is a flowchart of a method 900 for minimizing multi-destination traffic disruptions, according to one embodiment. The method 900 may be performed by a routing tool (e.g., routing tool 702) implemented in at least one network device (e.g., network device 700, leaf switch 106, spine switch 104, etc.) and/or controller 130. The routing tool can implement a routing protocol, such as IS-IS.

Method 900 begins at block 902, where the routing tool determines if a first network device (e.g., spine switch 104-1) has joined the network (e.g., pod 120-1). If not, the method remains at block 902. If the network device has joined, the routing tool determines a first preference of the first network device as a root for the default multi-destination tree (e.g., multi-destination tree 0) (block 904). After determining the first preference of the first network device as a root for the default multi-destination tree, the routing tool receives an indication of at least a second preference of at least a second network device (e.g., spine switch 104-2) as a root for the default multi-destination tree (block 906). In some embodiments, the routing tool may receive the indication of at least the second preference after a predetermined amount of time has elapsed, e.g., since the first network device joined the network and/or since the first network determined the first preference. At block 908, the routing tool determines if the first preference is greater than the second preference. If the first preference is greater, the routing tool triggers the first network device to take over as the root for the default multi-destination tree (block 910), and the method ends. If the second preference is greater, the routing tool triggers the first network device to refrain from taking over as the root for the default multi-destination tree (block 912), and the method ends. In some embodiments, when the first network device takes over as the root node and performs the SPF calculation, the first network device may perform a bi-directional check during the SPF calculation to avoid loops. In one embodiment, the bi-directional check may be performed prior to the first network device performing a sync-ACK process with another network device.

Figure 10:
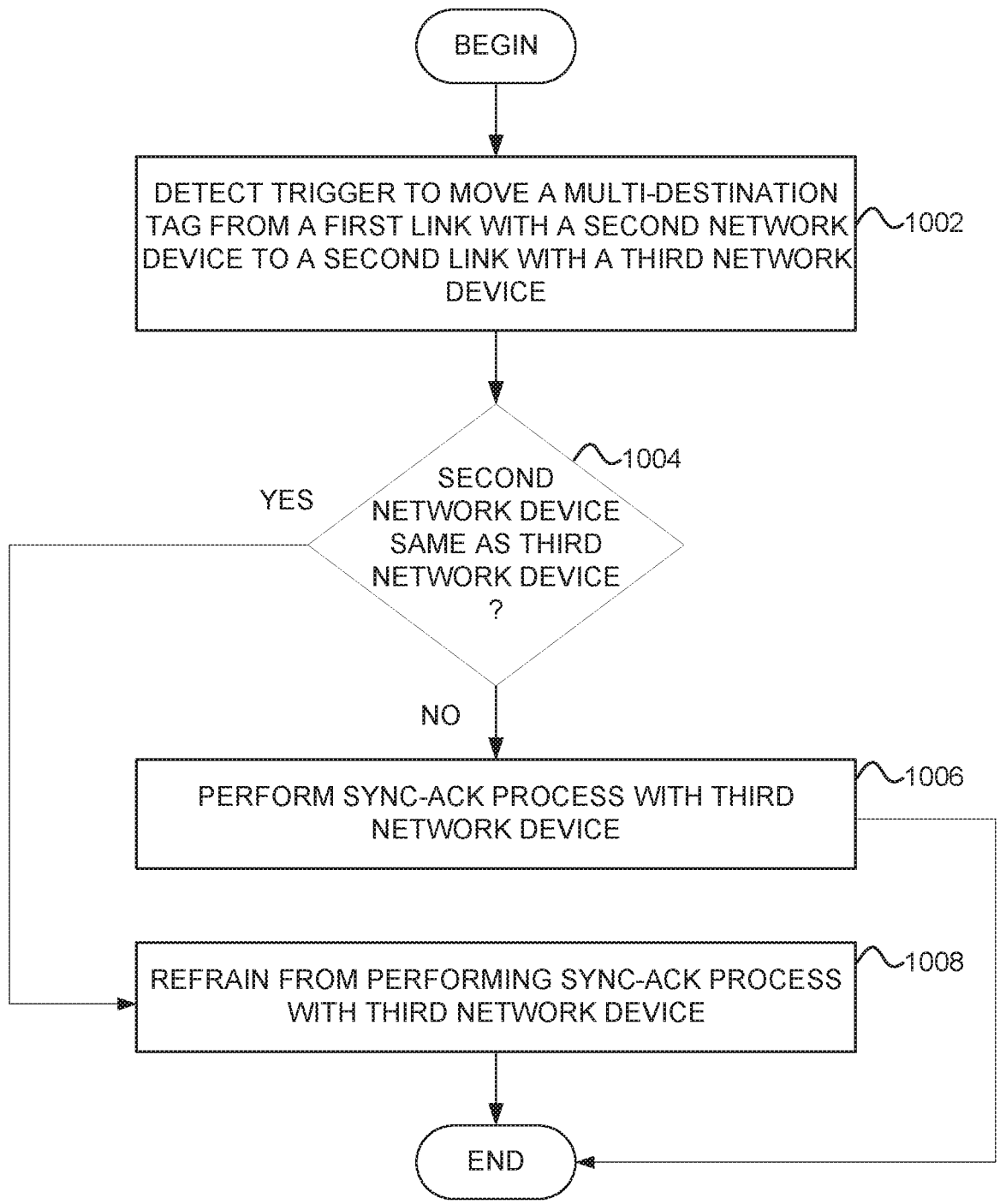
FIG. 10 is another flowchart for minimizing multi-destination traffic disruptions, according to one embodiment described herein.

FIG. 10 is a flowchart of a method 1000 for minimizing multi-destination traffic disruptions, according to one embodiment. The method 1000 may be performed by a routing tool (e.g., routing tool 702) implemented in at least one network device (e.g., network device 700, leaf switch 106, spine switch 104, etc.) and/or controller 130. The routing tool can implement a routing protocol, such as IS-IS.

Method 1000 begins at block 1002, where the routing tool detects a trigger to move from, a first network device, a multi-destination tag associated with a first link with a second network device to a second link with a third network device. At block 1004, the routing tool determines if the second network device is the same as the third network device. That is, the routing tool determines if the multi-destination tag is being moved between links of the same peer. If the second network device is the same as the third network device (e.g., indicating the links are being moved between the same peer node), the routing tool triggers the first network device to refrain from performing a sync-ACK process with the third network device (block 1008) and the method ends. If the second network device is not the same as the third network device (e.g., indicating the links are not being moved between the same peer node), the routing tool triggers the first network device to perform the sync-ACK process with the third network device (block 1006) and the method ends.

By disabling the internal sync process for multi-destination tree tag movement between links of the same peer, embodiments can substantially reduce multi-destination traffic loss for network fabrics that may not be capable of multi-destination traffic tag regeneration. In general, embodiments can use one or more (or a combination) of the techniques described in FIGS. 8-10 to significantly reduce multi-destination traffic loss.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computer-implemented method, comprising:
receiving, at a first network device in a first network, a multi-destination packet from a second network;
determining, by the first network device, based on the multi-destination packet, a first multi-destination tree of a plurality of multi-destination trees in the first network associated with forwarding of the multi-destination packet;
determining, by the first network device, that the first multi-destination tree is rooted on a second network device, different from the first network device, in the first network;
in response to determining that the first multi-destination tree is rooted on the second network device, determining, by the first network device, a second multi-destination tree of the plurality of multi-destination trees in the first network, wherein determining the second multi-destination tree comprises:
identifying a first subset of the plurality of multi-destination trees rooted at the first network device; and
selecting one of the first subset of the plurality of multi-destination trees as the second multi-destination tree; and
transmitting, by the first network device, the multi-destination packet using the second multi-destination tree.

2. The computer-implemented method of claim 1, further comprising changing, by the first network device, a status of a second subset of the plurality of multi-destination trees rooted at the second network device to inactive.

3. The computer-implemented method of claim 1, wherein determining the first multi-destination tree comprises determining a first multi-destination tree tag corresponding to the first multi-destination tree, based on a hash function applied to one or more fields of the multi-destination packet.

4. The computer-implemented method of claim 3, wherein the first multi-destination tree tag is a default multi-destination tree tag associated with forwarding multi-destination traffic received from the second network through the first network.

5. The computer-implemented method of claim 1, wherein:
the first network comprises a first pod of a multi-pod fabric; and the second network comprises a second pod of a multi-pod fabric.

6. A network device, comprising:
a processor; and
a memory containing a program that, when executed by the processor, performs an operation comprising:
receiving, in a first network, a multi-destination packet from a second network;
determining, based on the multi-destination packet, a first multi-destination tree of a plurality of multi-destination trees in the first network associated with forwarding of the multi-destination packet;
determining that the first multi-destination tree is rooted on another network device, different from the network device, in the first network;
in response to determining that the first multi-destination tree is rooted on the other network device, determining a second multi-destination tree of the plurality of multi-destination trees in the first network, wherein determining the second multi-destination tree comprises:
identifying a first subset of the plurality of multi-destination trees rooted at the network device; and
selecting one of the first subset of the plurality of multi-destination trees as the second multi-destination tree; and
transmitting the multi-destination packet using the second multi-destination tree.

7. The network device of claim 6, the operation further comprising changing a status of a second subset of the plurality of multi-destination trees rooted at the other network device to inactive.

8. The network device of claim 6, wherein determining the first multi-destination tree comprises determining a first multi-destination tree tag corresponding to the first multi-destination tree, based on a hash function applied to one or more fields of the multi-destination packet.

9. The network device of claim 8, wherein the first multi-destination tree tag is a default multi-destination tree tag associated with forwarding multi-destination traffic received from the second network through the first network.

10. The network device of claim 6, wherein:
the first network comprises a first pod of a multi-pod fabric; and
the second network comprises a second pod of a multi-pod fabric.

11. A non-transitory computer-readable storage medium comprising computer executable code, which when executed by one or more computer processors, performs and operation comprising:

receiving, at a first network device in a first network, a multi-destination packet from a second network;
determining, by the first network device, based on the multi-destination packet, a first multi-destination tree of a plurality of multi-destination trees in the first network associated with forwarding of the multi-destination packet;
determining, by the first network device, that the first multi-destination tree is rooted on a second network device, different from the first network device, in the first network;
in response to determining that the first multi-destination tree is rooted on the second network device, determining, by the first network device, a second multi-destination tree of the plurality of multi-destination trees in the first network, wherein determining the second multi-destination tree comprises:
identifying a first subset of the plurality of multi-destination trees rooted at the first network device; and
selecting one of the first subset of the plurality of multi-destination trees as the second multi-destination tree; and
transmitting, by the first network device, the multi-destination packet using the second multi-destination tree.

12. The non-transitory computer-readable storage medium of claim 11, further comprising changing, by the first network device, a status of a second subset of the plurality of multi-destination trees rooted at the second network device to inactive.

13. The non-transitory computer-readable storage medium of claim 11, wherein determining the first multi-destination tree comprises determining a first multi-destination tree tag corresponding to the first multi-destination tree, based on a hash function applied to one or more fields of the multi-destination packet.

14. The non-transitory computer-readable storage medium of claim 13, wherein the first multi-destination tree tag is a default multi-destination tree tag associated with forwarding multi-destination traffic received from the second network through the first network.

15. The non-transitory computer-readable storage medium of claim 11, wherein:
the first network comprises a first pod of a multi-pod fabric; and
the second network comprises a second pod of a multi-pod fabric.

* * * * *